Figure 1:
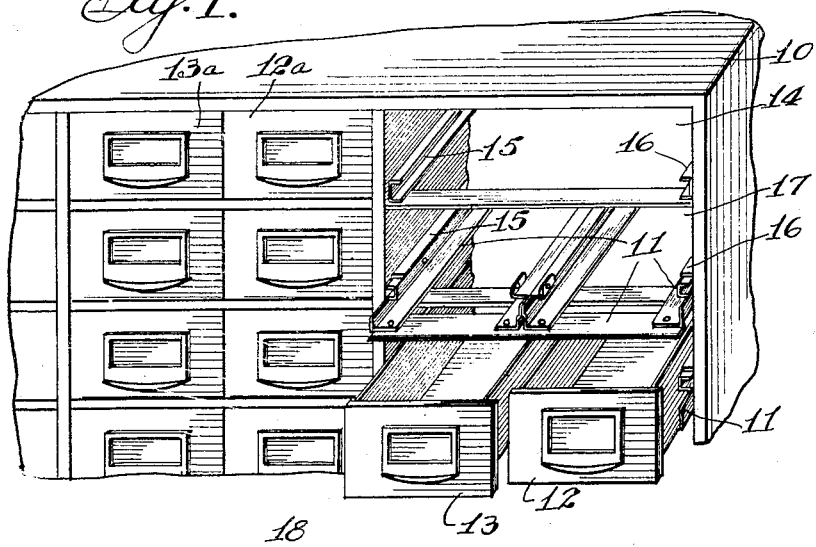

Oct. 10, 1933.  C. B. ULRICH  1,929,762

FILING SYSTEM AND APPARATUS THEREFOR

Filed Feb. 1, 1932  3 Sheets-Sheet 1

INVENTOR
CHARLES B. ULRICH.

BY Albert E. Bell
ATTORNEY

Oct. 10, 1933.  C. B. ULRICH  1,929,762

FILING SYSTEM AND APPARATUS THEREFOR

Filed Feb. 1, 1932  3 Sheets-Sheet 2

INVENTOR
CHARLES B. ULRICH

By Albert C. Bell
ATTORNEY.

Oct. 10, 1933.  C. B. ULRICH  1,929,762
FILING SYSTEM AND APPARATUS THEREFOR
Filed Feb. 1, 1932  3 Sheets-Sheet 3
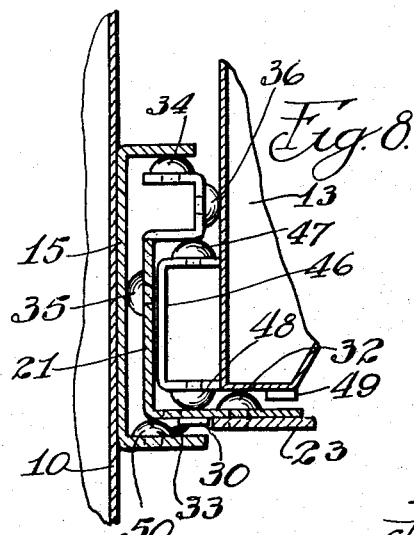
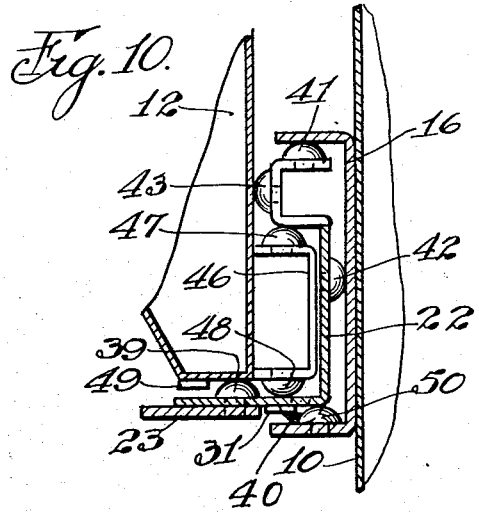
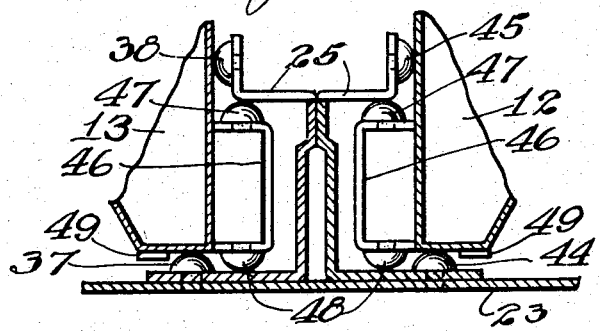
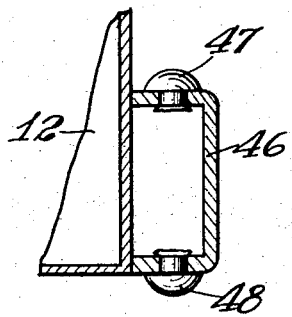
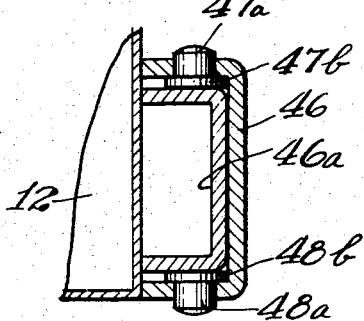
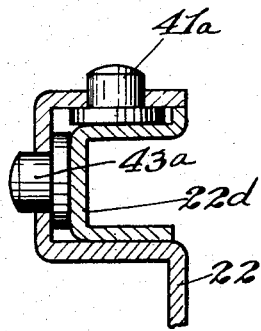
INVENTOR
CHARLES B. ULRICH.
BY Albert C. Bell
ATTORNEY.

Patented Oct. 10, 1933

1,929,762

UNITED STATES PATENT OFFICE 1,929,762

FILING SYSTEM AND APPARATUS THEREFOR

Charles B. Ulrich, Jamestown, N. Y., assignor to Art Metal Construction Company, Jamestown, N. Y., a corporation of Massachusetts Application February 1, 1932. Serial No. 590,107

7 Claims. (Cl. 45—77)

By my invention, I provide an improved system for filing data in active and transfer files, by which the structure of the active file is much simpler than in previous constructions, without sacrificing efficiency and ease of operation, and at the same time providing for the ready transfer of filed data from an active file to a transfer file.

My improved filing system is particularly adapted for use in large offices where, for example, thousands of trays are required to file data of the same general classification, in connection with which as a result of the amount of equipment involved, it is important that the structure shall be simple and at the same time be efficient in operation. Generally, in connection with filing systems, the filed data must for a first period of time, be conveniently accessible for ready and repeated reference, as well as for the convenient changing and expansion of the data filed, and to take care of this, I provide a first filing construction to house the filed data in classified arrangement, which for convenience may be called an active file. At the end of the active period referred to, the contents of the active file are no longer required for frequent reference and may be transferred to advantage to another file, which by my system is of much simpler construction than the active file, and for convenience may be called a transfer file.

By my invention I provide the active file with a floating suspension construction, preferably of larger size than the unit trays used in the active file, so that each floating suspension construction will carry a plurality of said trays, which trays are preferably of the same size and interchangeable, the number of trays carried by each floating suspension construction, being determined by the size of the trays required to receive the data to be filed, the size of the floating suspension structure being as large, preferably, as can conveniently be taken care of within the limits of practical construction and operation. In this manner, though each floating suspension structure carries a plurality of trays, it requires only one set of devices for supporting it in sliding arrangement in the casing of the file. At the same time, each tray is provided with individual slides so that it may be moved freely relatively to the suspension structure, when it is desired to examine the contents of that particular tray, the trays being preferably readily removable from the suspension structure, where it is desired to use the contents of any particular tray for a time at a point remote from the active file. The suspension structures referred to, permit the trays to be drawn from the casing, substantially their full length, and since each suspension structure supports a plurality of trays, the construction of the active file is much simpler and cheaper than it would be if an individual suspension structure were employed in connection with each tray, as has been the practice in the past.

Another important feature of my present invention consists of providing the trays and the suspension structures, with novel bearing devices, consisting preferably of studs of anti-friction alloy for engagement with the adjacent slides of the mechanism employed to support the several parts of the structure in operative position, so that in moving a tray on its suspension structure, or moving the suspension structure relatively to the casing, there is practically frictionless engagement between the parts having relative movement, which permits the trays to be drawn from the casing with little effort, even though they carry a considerable weight of filed data. In this manner I provide for ease of operation of the parts, without using antifriction rollers or ball bearings, and thus simplify and cheapen the construction.

The above and other objects of my invention will more fully appear from the accompanying drawings illustrating my invention, in which Fig. 1 shows in perspective view a portion of an active file of my system, some of the parts being removed in this view, to more clearly show the movable parts of the file.

Figure 2:
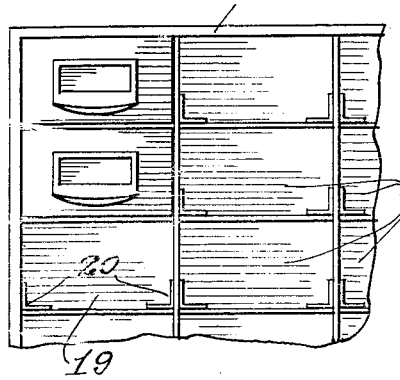
Figures 5, 6, 7:
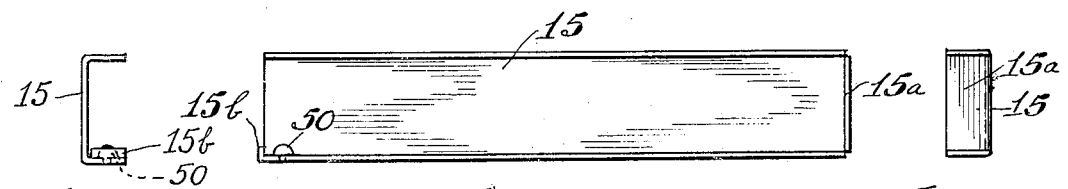
Figure 3:
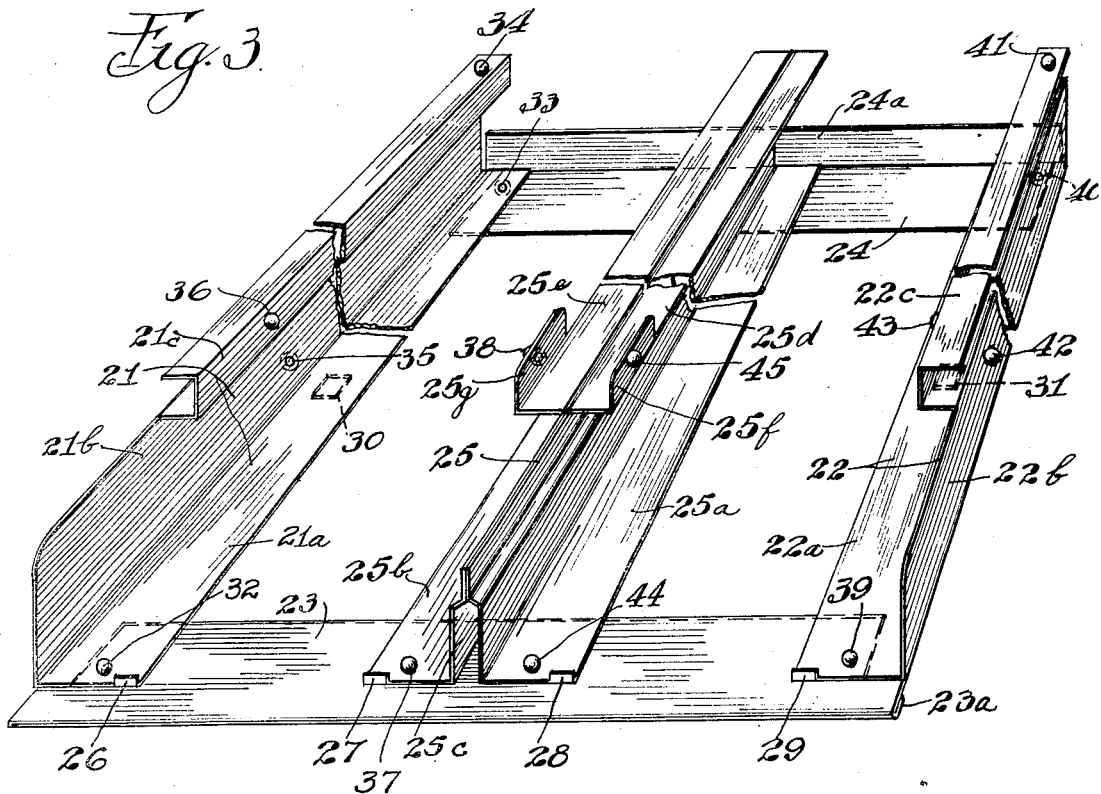
Figure 4:
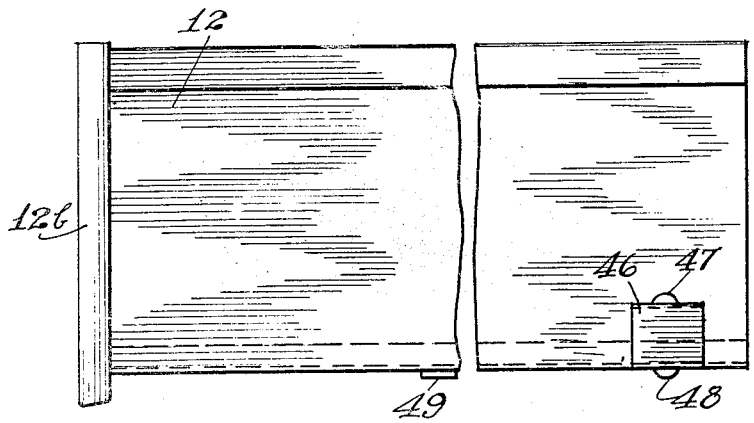

Fig. 2 shows in front elevation, a portion of a transfer file of my system,

Fig. 3 shows in perspective view to an enlarged scale, one of the floating suspension structures removed from the casing of the active file, with the trays removed from said structure, Fig. 4 shows in side elevation, one of the trays used on the suspension structure shown in Fig. 3, Fig. 5 shows in side elevation one of the casing channel bars used to support the floating suspension structure shown in Fig. 3, Fig. 6 is a left hand end view of the channel bar shown in Fig. 5, Fig. 7 is a right hand end view of the channel bar shown in Fig. 5, Fig. 8 is a vertical sectional view to an enlarged scale, through the left hand portion of one of the floating suspension structures in place in the file and with a tray on said suspension structure, this view being taken inside of the front wall of the said tray and with the parts in their closed condition, Fig. 9 shows in a view similar to Fig. 8, a vertical sectional view of an intermediate slide bar of a suspension structure, and its relation to the adjacent side and bottom portions of trays carried by the suspension structure, Fig. 10 shows in a view similar to Fig. 8 the relation of the right hand portion of a suspension structure to its supporting channel bar, and also to the adjacent side and bottom portions of a tray supported by the suspension structure, Fig. 11 is a vertical sectional view to an enlarged scale through a portion of a tray, illustrating the mounting of studs of anti-friction alloy on the tray, to constitute its bearing surfaces on the adjacent portions of a suspension structure, Fig. 12 shows in a view similar to Fig. 11, a modified manner of mounting studs of anti-friction alloy on a tray, and Fig. 13 shows in a vertical sectional view, a part of one of the side bars of a suspension structure and means that may be employed to support on it, studs of anti-friction alloy, of the kind illustrated in Fig. 12.

Similar numerals refer to similar parts throughout the several views.

As shown in Fig. 1, I illustrate at 10 the casing of an active file provided with compartments for receiving suspension structures or frames 11 of the kind illustrated in Fig. 3, each suspension structure as illustrated, having provision for supporting two trays 12 and 13. The suspension structure is removed from the compartment 14, to more clearly show the position of the channel bars 15 and 16 employed to support the suspension structures, these channel bars being rigidly secured to the casing 10 in horizontal and parallel relation as indicated. The trays are removed from the suspension structure 11 shown in the compartment 17, to more clearly illustrate the relation of the suspension structures to their supporting channel bars. The trays 12 and 13 are shown partly extended from the casing 10, to illustrate their relation to their suspension structure 11, it being understood that when either one of the trays 12 and 13 is drawn from the casing, the corresponding suspension structure 11 is drawn outwardly with it in a manner to disclose the entire contents of the withdrawn tray, and that at the same time the other one of the trays 12 and 13 moves outwardly with the suspension structure 11, to the extent that the latter may be drawn from the casing 10. Other pairs of trays 12a, 13a are illustrated in Fig. 1 in their closed condition, it being understood that each pair of trays 12a and 13a is provided with a single floating suspension structure of the kind illustrated at 11. The trays are preferably provided with card holders and handles of any desired kind as indicated.

From the above, it will appear that the floating suspension structures are simpler and cheaper as a result of each carrying a plurality of trays, than if each tray were provided with its own suspension structure. The trays are preferably interchangeable, and when the contents of any tray is no longer active, the corresponding tray is preferably transferred bodily from the active file to a transfer file, for example, of the kind illustrated in Fig. 2, which transfer file is provided with a casing 18 having individual compartments 19, 19 each being of a size to receive an individual tray, each of said compartments 19 being provided with angle bars 20, 20 extending horizontally and in parallel relation and supported by the casing 18, to constitute a sliding support for the tray placed in the corresponding compartment of the transfer file. The transfer file thus provides for receiving the trays as rapidly as their contents cease to be active, leaving the active file to be used repeatedly for all matters requiring frequent reference within the classification represented by the active file, and the transfer file provides that trays of the size used in the active file, may be filed in it whether they come from one active file or another.

As shown in Fig. 3, each suspension frame 11 preferably consists of side bars or slides 21 and 22 held in parallel relation by front and rear cross bars 23 and 24 which are rigidly secured to the side bars, for example, by welding. Between the bars 21 and 22, an intermediate slide bar 25 is mounted in parallel relation with the bars 21 and 22, with its ends rigidly secured to the cross bars 23 and 24, for example, by welding. The side bar 21 preferably consists of a sheet metal angle bar having a horizontal member 21a and a vertical member 21b, and a portion of channel cross-section 21c extending from the upper edge of the vertical member 21b, beginning at a point somewhat back of the front end of the vertical member 21b, to permit the ready removal of a tray carried by the suspension frame. The channel portion 21c extends first horizontally and towards the side bar 22, then upwardly, and then horizontally and substantially parallel with the lower member of the channel portion, the outer upper edge of the channel portion being substantially in the plane of the vertical member 21b. The side bar 22 similarly consists of a horizontal member 22a, a vertical member 22b and a channel portion 22c, the difference being that the parts are reversed, so that the vertical members 21b and 22b constitute the outer side surfaces of the suspension frame, and that the channel portions 21c and 22c open outwardly away from each other. The intermediate bar 25 consists preferably of two sheet metal angle bars 25a and 25b secured together at their upper portions, for example, by welding, and having the lower portions of their vertical members separated somewhat as shown at 25c, to stiffen the bar construction and correspondingly stiffen the suspension frame as a whole. Beginning at a point substantially in line with the front ends of the channel members 21c and 22c, the vertical members of the angle bars 25a and 25b are provided with horizontal flanges 25d and 25e extending outwardly from each other, and from the outer edges of the flanges 25d and 25e, short vertical flanges 25f and 25g are preferably extended for a purpose to be described.

The bars 21 and 25 of the structure shown in Fig. 3, are preferably provided at their front ends, with upwardly extending lugs 26 and 27 to limit forward or outward movement of the corresponding tray, and the bars 25 and 22 are preferably provided with similar lugs 28 and 29 to limit forward or outward movement of the tray supported by these bars. The bars 21 and 22 preferably have on their lower surfaces, downwardly projecting lugs 30 and 31 to limit forward or outward movement of the suspension structure relatively to the casing, the lugs 30 and 31 being substantially mid-way between the front and rear ends of the bars 21 and 22 respectively. The cross bar 23 is preferably folded, at its front edge as indicated at 23a to stiffen it, and the front ends of the bars 21, 25 and 22 are a sufficient distance back of the front folded edge of the bar 23 to receive the front walls of the trays supported by the suspension frame.

As shown in Fig. 3, the bar 21 is provided with bearing studs 32, 33, 34, 35 and 36. The angle bar 25b is provided with a bearing stud 37 at its front end, and the flange 25g is provided with a bearing stud 38. The bar 22 is provided with bearing studs 39, 40, 41, 42 and 43 corresponding to the bearing studs above referred to on the side bar 21, and the angle bar 25a and flange 25f are provided with bearing studs 44 and 45 corresponding to the bearing studs 37 and 38. The purpose of these bearing studs is below described. The rear cross bar 24 of the suspension frame is provided with an upwardly extending flange 24a to stiffen the cross bar and the suspension frame, and to limit movement of the trays rearwardly on the suspension frame, in cases where the front walls of the trays do not engage the front ends of the bars 21, 25 and 22 when the trays are in their fully closed condition.

As shown in Fig. 4, each tray, as illustrated for the tray 12, preferably consists of sheet metal side, end and bottom walls, of any size and proportions required to accommodate the matter to be filed, the front wall 12b being preferably formed to have substantial thickness to stiffen the tray and give it a pleasing appearance. The tray is preferably equipped with a follower block not shown, in any manner well known in the art. The tray has secured to each of its side walls and adjacent its rear end, a laterally projecting portion 46 provided with upper and lower bearing studs 47 and 48. The bottom wall of the tray is preferably provided with downwardly extending lugs 49 for limiting forward or outward movement of the tray, in co-operation with the lugs 26 and 27 or 28 and 29, depending on the portion of the suspension frame on which the tray is placed. The overall width of the extending portions 46 of the tray, is preferably such as to fit freely between the vertical members of the bars 21 and 25 or 25 and 22 as the case may be, and the height of the extension 46 over the bearing studs 47 and 48, is such as to slide freely between the horizontal member 21a of the bar 21 and the channel portion 21c of said bar, and also between the horizontal member of the angle bar 25b and its flange 25e, assuming that the tray is placed on the bars 21 and 25, it being understood that the angle bar 25a and the bar 22 are constructed to similarly receive the tray in sliding relation, if it is placed on the latter bars of the suspension frame.

As shown in Figs. 5, 6 and 7, the casing channel bar 15 is provided at its rear end with a flange 15a extending from the web of the channel bar in the same direction as the edge flanges thereof, to limit rearward movement of the suspension frame on said channel bar, and at its front end the channel bar is provided with an upwardly extending lug 15b for co-operation with the lug 30 shown in Fig. 3, to limit outward movement of the suspension frame when the latter rests on its supporting studs. The front end of the lower flange of the channel bar 15 is provided with a bearing stud 50 for a purpose to be described. Each of the channel bars 16 is similar to the channel bar 15, excepting that its parts are reversed, so that the flanges of the channel bars 15 and 16 in each of the compartments in the casing 10, extend towards each other.

As shown in Fig. 8, the vertical portion of the side bar 21 is contained between the flanges of the channel bar 15 with a sliding fit, so that the bar 21 rests on and is in sliding engagement with the bearing stud 50 at all times that the suspension frame 11 is supported by the channel bars 15 and 16. When the trays and the suspension frame are in positions tending to move the rear end of the suspension frame downwardly, the bearing stud 33 rests upon the lower flange of the channel bar 15 and in sliding engagement therewith, and the bearing stud 34 clears the upper flange of the channel bar 15, so that the bar 21 may be moved freely in the channel bar. When the trays and the suspension frame are in a relation to the channel bar 15, tending to raise the rear end of the bar 21, the bearing stud 34 is in sliding engagement with the upper flange of the channel bar 15 and the bearing stud 33 clears the lower flange of said channel bar. In this manner free sliding movement of the bar 21 in the channel bar 15 is provided for, regardless of the relation of the trays to the suspension frame and regardless of the relation of the suspension frame to the channel bar 15. As also shown in Fig. 8, the tray 13 rests at its front end on the bearing stud 32 at all times that the tray is supported by the suspension frame. When the tray has a relation to the suspension frame tending to move the rear end of the tray downwardly, the bearing stud 48 is in sliding engagement with the bar 21 and the bearing stud 47 is sufficiently clear of the bar 21 to permit free sliding movement of the tray. When however, the tray is moved forwardly and the rear end of the tray tends to move upwardly, the bearing stud 47 is in sliding engagement with the bar 21 and the bearing stud 48 is clear of said bar 21, thus supporting the tray in horizontal position for all of its positions relatively to the suspension frame and relatively to the casing of the file.

As illustrated in Fig. 10, the tray 12, the sliding bar 22 and the channel bar 16 are disposed in the same relation vertically, as that described in connection with Fig. 8 for the parts there shown, and the several bearing studs employed to sustain the weight of the suspension frame and the tray 12, operate in the same manner described in connection with Fig. 8. Bearing in mind that the suspension frame as a whole, is a rigid structure, it will be observed that the bearing studs 35 and 42 shown in Figs. 8 and 10, limit side movement of the suspension frame, by sliding engagement with the channel bars 15 and 16, the distance between the web portions of the channel bars when they are supported rigidly in place in parallel relation by the casing 10, being just enough greater than the overall width of the bearing studs 35 and 42 to permit free sliding movement of the suspension frame in the channel bars 15 and 16.

As shown in Fig. 9, the front portions of the trays 13 and 12 adjacent the bar 25 of the suspension frame, rest on the bearing studs 37 44 carried by the suspension frame, at all times that the trays are carried by the suspension frame. When either of the trays is moved outwardly relatively to the suspension frame so that the rear end of the tray tends to move upwardly, the corresponding bearing stud 47 is in sliding engagement with one of the upper horizontal flanges of the bar 25, and when either of the trays is in a position tending to move the back end of the tray downwardly, the bearing stud 48 is in sliding engagement with the bar 25, the vertical height over the bearing studs 47 and 48 in each case, permitting free sliding movement of the studs between the corresponding horizontal flange of the bar 25 and the corresponding horizontal member of said bar.

As a result of the construction described in Figs. 8, 9 and 10, it will be observed that the bearing studs 36 and 38 are adjacent the side walls of the tray 13, and the distance between these bearing studs is slightly greater than the outside width of the tray, so that the tray may slide freely between the bearing studs 36 and 38, these studs serving to limit lateral movement of the tray and prevent what might otherwise be appreciable side friction of the tray against the suspension frame. The bearing studs 45 and 43 similarly prevent appreciable side friction of the tray 12 against the suspension frame.

It will be observed that the engagement of the lugs 26, 27, 28 and 29 with the lugs 49 of the corresponding trays, is of small amount vertically, permitting disengagement of the tray lugs by lifting the outer ends of the trays in their extended position, by which relation the trays may be removed as desired from the suspension frames, where, for example, it is desired to work for a time with the contents of any particular tray away from the active file, or to move the tray to the transfer file. The construction of the front end portions of the side and intermediate bars of the suspension frames above described, permits the ready separation of the projecting portions 46 of any particular tray from the corresponding ones of said side and intermediate bars, in removing that tray from its suspension frame. Obviously, the trays may as readily be placed on the suspension frames as desired. In a similar manner, the suspension frames may readily be placed in the file casing and removed therefrom as desired.

The several bearing studs described are preferably made of metal alloy having anti-friction properties, as distinguished from bearing studs of metal having little if any different characteristics than the metal surfaces engaged by said studs. It is well known in the art that where any metal rubs upon a similar metal, or even where dissimilar metals rub upon each other if they are of the same nature, for example, where both of the metals are fibrous, considerable friction is apt to develop and abrasion of one metal or the other may readily result, even though the rubbing metals are lubricated. An important object of my present invention is to reduce this rubbing friction to a negligible minimum, and to eliminate abrasion, even when the rubbing surfaces are not lubricated. This I accomplish by providing the slide bars or members with smooth surfaces, and by constructing the bearing studs of a metal alloy that is smooth and not abrasive, for example by using copper or bronze alloy mixed with graphitic material, so that the graphitic element of the alloy prevents abrasion or cutting when the bearing stud is rubbed against its co-operating slide. This produces a construction that is highly efficient in use, and at the same time one that is relatively cheap to manufacture, as compared with other structures intended for this purpose and consisting of anti-friction rollers, ball bearings or similar devices. It will be understood that I do not limit the application of such bearing studs to the particular purpose disclosed in the present application, as they may be effectively used in other constructions where it is desired to eliminate abrasion resulting from one metal structure sliding on another metal structure.

In Fig. 11, I illustrate the preferred manner of mounting the bearing studs referred to, this figure being a vertical sectional view through a portion of a tray 12 and its extension 46. As illustrated in this figure, each of the bearing studs 47 and 48 is in the form of a cylindrical rivet with an oval or half-round head, the shank of the stud being riveted as indicated to hold it in place in a circular opening in the extension 46. The other bearing studs above described, may be similarly formed and secured in place.

In Figs. 12 and 13 I illustrate a modified form of bearing stud and a modified means for supporting the bearing studs in place. In Fig. 12 I illustrate bearing studs 47a and 48a carried by the extension 46 of a tray 12, the studs 47a and 48a being cylindrical and provided with inner flanges 47b and 48b so that they may be inserted outwardly through circular openings in the extension 46 therefor, the heads 47b and 48b limiting outward movement of the studs. With this construction, a small channel bar 46a is inserted in the extension 46, to rest snugly against the heads 47b and 48b when they are in the position indicated, and in this manner the studs are securely held in bearing position to sustain any forces exerted upon them. In Fig. 13, I illustrate studs 41a and 43a similar in form to the studs 47a and 48a and held in place in a bar 22 by a short channel bar 22d which, by being rigidly secured in the channel portion of the bar 22, holds the studs 41a and 43a securely in position to withstand the bearing forces exerted upon them. The other studs of the structure may be similarly supported if desired. It will be understood that while I refer to the bearing studs as being of circular cross section, they may have any desired form of cross section and may be of any desired size and shape, depending upon the requirements in any particular case, and furthermore that the means employed to attach them to the structure carrying them, may be of any form desired.

In carrying out my invention it will be understood that the anti-friction studs employed may be used in different arrangements to meet the requirements of different cases. For example, when the matter required to be filed, consists of cards of small size, and the trays are correspondingly small, it may not be desired to provide the trays with anti-friction devices to support them, on account of their relatively light weight; again, in some constructions it may not be desired to provide the trays with anti-friction devices of any kind to reduce lateral friction of the trays against the adjacent metal parts; in still other cases it may not be desired to provide the suspension frames with anti-friction devices to reduce lateral friction of the frames against the adjacent parts carried by the casing. In general, the anti-friction studs are intended for use in any constructions where abrasion of metal parts might occur as a result of their rubbing upon each other.

While I have shown my suspension frames above described, as adapted to carry two trays for each of said frames, as illustrative of that phase of my invention, it will be understood that more than two trays may be carried by each suspension frame if desired, by adding to the frame, additional intermediate bars similar to the bar 25 above described, so that each tray is provided with guides and supporting mechanism substantially as above described. More than two trays for each suspension frame may be used to advantage where the matter to be filed in the trays consists of cards or papers of small size, which is frequently the case in large filing systems.

The particular floating suspension structure shown and described is illustrative of but one particular embodiment of my invention, and it will be understood that I do not limit myself to any specific structure in carrying out my invention, since it may be embodied in many different forms to meet the requirements of different cases.

While I employ the term "tray" to designate a filing receptacle supported by a suspension structure, it will be understood that I include within the meaning of that term, any form of drawer or receptacle for filing desired data and adapted to be supported and used substantially as described.

While I have shown my invention in the particular embodiment above described, it will be understood that I do not limit myself to this exact construction as I may employ equivalents known to the art at the time of the filing of this application without departing from the scope of the appended claims.

What I claim is:

1. In a file, the combination of a casing, pairs of channel bars rigidly supported in horizontal position by said casing, a suspension frame supported for sliding movement from and into said casing by each pair of said channel bars, each of said suspension frames comprising side bars and an intermediate bar in parallel relation and substantially parallel with said pair of channel bars, and front and rear cross bars rigidly secured to said side and said intermediate bars, and a plurality of trays carried by each of said suspension frames, said side bars and said intermediate bar of each suspension frame engaging the corresponding trays for sliding movement, said trays having side formations retaining them in engagement with said side and said intermediate bars.

2. In a file, the combination of a casing, pairs of channel bars rigidly supported in horizontal position by said casing, a suspension frame supported for sliding movement from and into said casing by each pair of said channel bars, each of said suspension frames comprising side bars and an intermediate bar in parallel relation and substantially parallel with said pair of channel bars, and front and rear cross bars rigidly secured to said side and said intermediate bars, a plurality of trays carried by each of said suspension frames, said side bars and said intermediate bar of each suspension frame engaging the corresponding trays for sliding movement, said trays having side formations retaining them in engagement with said side and said intermediate bars, and anti-friction studs supporting said frames and said trays.

3. In a file, the combination of a casing, pairs of channel bars rigidly supported in horizontal position by said casing, a suspension frame supported for sliding movement from and into said casing by each pair of said channel bars, each of said suspension frames comprising side bars and an intermediate bar in parallel relation and substantially parallel with said pair of channel bars, and front and rear cross bars rigidly secured to said side and said intermediate bars, a plurality of trays carried by each of said suspension frames, said side bars and said intermediate bar of each suspension frame engaging the corresponding trays for sliding movement, said trays having side formations retaining them in engagement with said side and said intermediate bars, and anti-friction studs supporting said frames.

4. In a file, the combination of a casing, pairs of stationary guideways supported in horizontal position by said casing, suspension frames supported for sliding movement by said guideways, and a plurality of trays supported by each of said frames for sliding movement relatively thereto, each of said frames having a pair of second guideways rigidly secured thereto for each of the trays supported thereby, said second guideways retaining the corresponding trays on said frames.

5. In a file, the combination of a casing, pairs of stationary guideways supported in horizontal position by said casing, suspension frames supported for sliding movement by said guideways, a plurality of trays supported by each of said frames for sliding movement relatively thereto, each of said frames having a pair of second guideways rigidly secured thereto for each of the trays supported thereby, said second guideways retaining the corresponding trays on said frames, first stops limiting outward movement of said frames, and second stops limiting outward movement of said trays relatively to the frames supporting them.

6. In a file, the combination of a casing, pairs of stationary guideways supported in horizontal position by said casing, suspension frames supported for sliding movement by said guideways, a plurality of trays supported by each of said frames for sliding movement relatively thereto, each of said frames having a pair of second guideways rigidly secured thereto for each of the trays supported thereby, said second guideways retaining the corresponding trays on said frames, first stops limiting outward movement of said frames, and second stops limiting outward movement of said trays relatively to the frames supporting them, said second guideways being cut away at their outer ends, and said second stops having engagement of small extent vertically, whereby said second stops for any said tray may be disengaged by lifting the outer end of said tray and said tray may be removed from the said frame supporting it.

7. In a file, the combination of a casing, a suspension frame, first guideways carried by said casing and supporting said frame for sliding movement, a plurality of trays carried by said frame, and second guideways carried by said frame and engaging said trays for sliding movement of the latter relatively to said frame and independently of each other.

CHARLES B. ULRICH.